Jan. 5, 1960 A. A. CHERNOSKY 2,920,307
VARIABLE GAP RELUCTANCE TRANSDUCER
Filed July 19, 1954 3 Sheets-Sheet 1
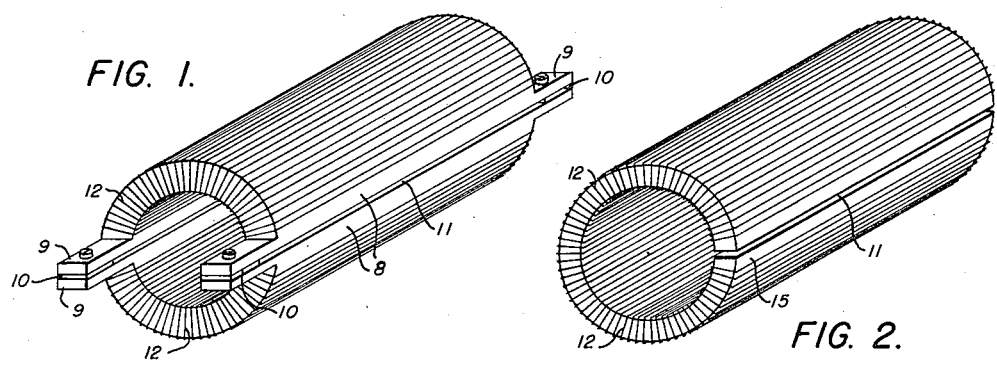
FIG. 1.
FIG. 2.
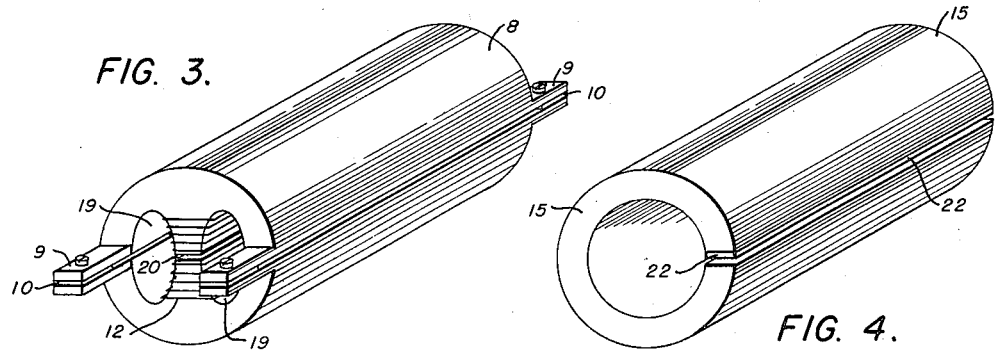
FIG. 3.
FIG. 4.
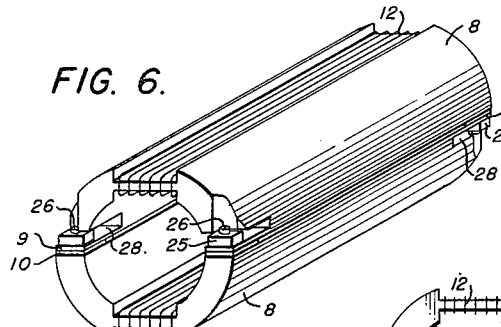
FIG. 6.
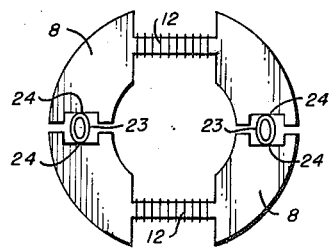
FIG. 5.
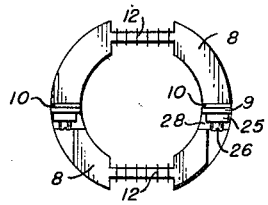
FIG. 7.
INVENTOR.
Allen A. Chernosky,
BY Frank S. Troidl
AGENT.

Jan. 5, 1960 A. A. CHERNOSKY 2,920,307
VARIABLE GAP RELUCTANCE TRANSDUCER
Filed July 19, 1954 3 Sheets-Sheet 2
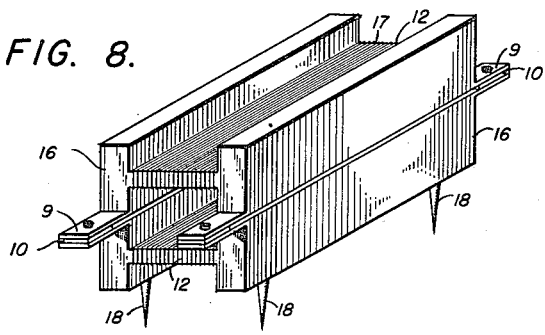
FIG. 8.
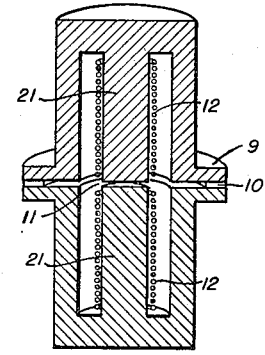
FIG. 9.
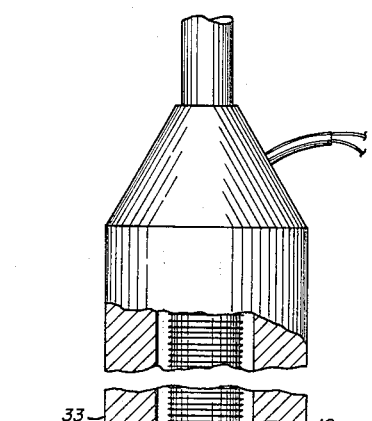
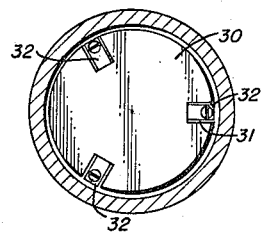
FIG. 11.
FIG. 10.
INVENTOR.
Allen A. Chernosky,
BY
Frank S. Tridl
AGENT.

INVENTOR.
Allen A. Chernosky,
BY Frank S. Troidl
AGENT

United States Patent Office 2,920,307
Patented Jan. 5, 1960

2,920,307

VARIABLE GAP RELUCTANCE TRANSDUCER

Allen A. Chernosky, Houston, Tex., assignor, by mesne assignments, to Jersey Production Research Company, Tulsa, Okla., a corporation of Delaware Application July 19, 1954, Serial No. 444,171

5 Claims. (Cl. 340—17)

This invention relates to geophysical prospecting. More particularly, this invention relates to a variable reluctance transducer for detecting air borne, water borne or solid borne waves and producing an electrical signal indicative of the character of the detected waves.

Transducers in general use are of three types:
(1) Displacement.
(2) Velocity.
(3) Acceleration.

All of the aforementioned types depend for their electrical signal on the relative movement of one element in the transducer, usually called an inertia mass, with respect to another element which moves in response to the impinging waves. Motion sensitive transducers are displacement, velocity or acceleration sensitive depending upon the frequencies applied and the natural frequency of the transducer. Displacement sensitivity occurs for a given transducer when the applied frequencies are much higher than the natural frequency of the transducer. Velocity sensitivity occurs when the applied frequency is equal to the natural frequency. Acceleration sensitivity occurs when the applied frequency is low relative to the natural frequency. More recently, a different type of transducer has been utilized in certain geophysical prospecting. These transducers have been named "squeeze" or "pressure" transducers and generate an electrical signal as the result of a deformity of the transducer occasioned by the pressure of the impinging waves. An example of a "pressure" or "squeeze" type transducer is the magnetostrictive seismometer. The magnetostrictive core of magnetostrictive seismometers is deformed when the seismic waves impinge upon the magnetostrictive element and a change in electric current occurs as a result of the deformity. The present invention, in several of its embodiments, makes use of the "pressure" or "squeeze" principle and in other of its embodiments makes use of the relative-movement principle for the detection of impinging waves and the generation of electrical signals indicative of the character of said waves.

My invention when employed as a variable reluctance type seismometer is used with the conventional amplifier and recorder for detecting and recording seismic waves set up by explosives or other means. The conventional variable reluctance type seismometer makes use of a permanent magnet for producing a permanent magnetomotive force. These conventional seismometers, all of which, in the past, have been of any one of the three motion types aforementioned, produce a change in voltage in response to the relative movement of a casing in which the permanent magnet is enclosed with respect to an armature suspended in the casing by means of a spring, which armature constitutes the inertia mass of the seismometer. However, the usual permanent magnet, because of its hard magnetic material, is not sensitive enough to detect and sufficiently indicate the very minute vibrations of some of the seismic waves which it is desired to detect.

My invention makes use of a seismometer made of a soft magnetic material. My new seismometer is much more sensitive than the conventional variable reluctance seismometers, is very simple in construction and can be used as a velocity, displacement or acceleration type seismometer or a "squeeze" or "pressure" type seismometer. Soft magnetic material has been utilized before in variable reluctance type seismometers. However, all previous variable reluctance seismometers employing soft magnetic material have been of the velocity, displacement or acceleration type and have been utilized to modulate an external source of carrier current, it being believed by previous seismic prospectors that the soft magnetic material could not be utilized as a generator of electrical energy in response to seismic waves. The use of a variable reluctance transducer utilizing a soft magnetic material to modulate a carrier current is described in the patent to J. P. Minton, 2,371,973, issued on March 20, 1945. I have made the important discovery that a variable reluctance seismometer can be made, utilizing a soft magnetic material, which can be used as a very sensitive generator of electrical signals in response to detected seismic waves and hence does not need any external carrier current or other external source of energy in order to be effective. In addition, the utilization of a soft magnetic material which is highly sensitive to even the slightest pressure makes possible a variable reluctance transducer which depends upon a "pressure" or "squeeze" action as distinguished from a velocity, displacement or acceleration type action.

It is an object, therefore, of my invention to provide an instrument which is simple in structure and is highly sensitive to detected waves.

It is a further object of my invention to provide a variable reluctance type seismometer which is an independent generator of electrical signals in response to detected waves and needs no external source of electrical energy.

Briefly described, my invention consists of a loop or circuit of soft magnetic material broken by one or more relatively short air gaps comprising a permanently magnetizable circuit. This air gap is of the order of a few thousandths of an inch. Electromagnetically associated with the soft magnetic material is an electrical coil, the voltage of the coil being varied when the width of the air gap is altered in response to impinging seismic waves thereby producing a varying electrical voltage.

Other objects and features of the invention will become more apparent upon a consideration of the accompanying drawings and following specification, wherein are disclosed several embodiments of the invention with the understanding that such changes may be made therein as fall within the scope of the appended claims without departing from the spirit of the invention.

In the drawings:

Fig. 1 shows a perspective view of my new seismometer.

Fig. 2 is a perspective view of a second embodiment of my new invention.

Fig. 3 is a perspective view of another embodiment of my invention.

Fig. 4 is a perspective view of still another embodiment of my invention.

Fig. 5 is a front elevational view of another embodiment of my invention.

Fig. 6 is a perspective view of still another embodiment of my invention.

Fig. 7 is a rear elevational view of the embodiment shown in Fig. 6.

Fig. 8 is a perspective view of an embodiment of my invention used as a motion type seismometer.

Fig. 9 is a sectional side elevational view of a second embodiment of my invention used as a motion type seismometer.

Fig. 10 is a side elevational view, partly in section, of still another embodiment of my invention used as a motion type seismometer.

Fig. 11 is a view taken along line 11—11 of Fig. 10.

Figure 12:
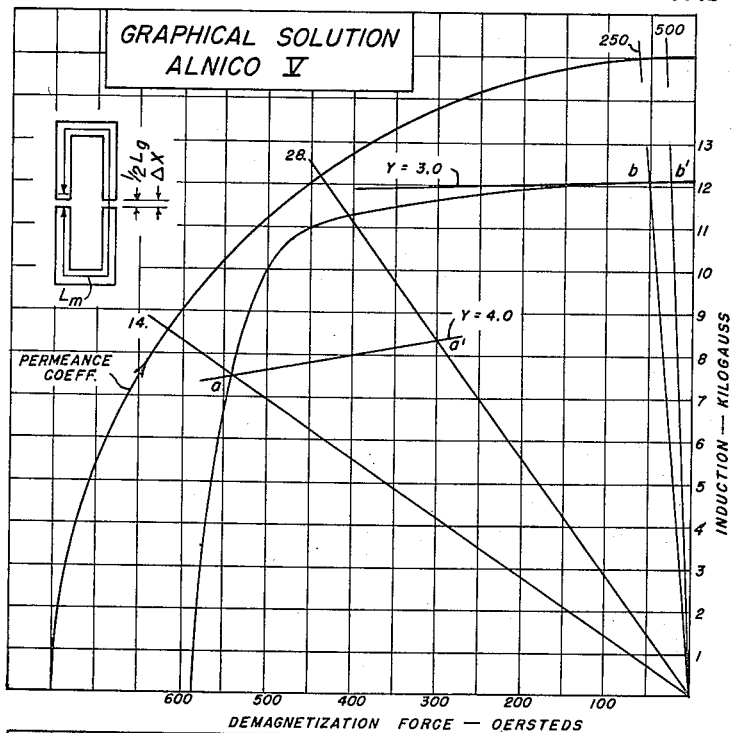
Figs. 12 and 13 show graphs indicating the higher sensitivity due to increased permeability to alternating flux of a seismometer utilizing soft magnetic material having approximately the same residual magnetism as the conventional seismometers which make use of a hard magnetic material.

In Fig. 1 there is shown one embodiment of my invention. The seismometer consists of a pair of semi-cylindrical members 8 which are machined from a magnetic material, leaving the cantilever extensions 9 which function as separator springs when spacers 10 are used at their extremities. The spacers 10 preferably are made of non-magnetic material. When the two members 8 are connected together at the extremities of the cantilever extensions 9, by means of screws, a substantially hollow cylindrical seismometer is produced which is of a very convenient shape to be placed about a cable such as the cables used in marine prospecting or land prospecting. Wound about the members 8 are coils 12. Spacer 10 is utilized to provide a very minute separation or air gap 11 between the two semi-cylindrical members 8. This spacer may be of the order of 2/1000 of an inch. The cantilever extensions 9 have a natural mechanical frequency of from 300 to 2000 cycles per second. A high natural mechanical frequency for extensions 9 serves as a means to diminish the output at the unwanted low frequencies, such as extraneous ground noises, etc. This high natural mechanical frequency also prevents the setting up of a resonance in the seismometer caused by the impingement of seismic frequencies which are close to the natural frequency of the extensions since seismic frequencies are lower than the instrument's mechanical frequency. However, because of the reduced mechanical gain of the extensions 9, it is highly desirable that a very sensitive generator of electrical signal power be utilized. Therefore, the use of a hard magnetic material in the making of the semi-cylindrical members 8 would result in an inefficient instrument because a hard magnetic material has a low permeability and it is not sensitive enough to air-gap variation. In the present design, a soft magnetic material which has a high permeability is utilized as a relatively permanent magnetomotive force with very high sensitivity to air-gap variation. The initial magnetization of the device shown in Fig. 1, as well as the other devices described, may be accomplished by applying a high amplitude momentary direct current through the signal coil. When the members 8 are made of a soft magnetic material, and the air gap 11 is made of the order of a few thousandths of an inch, my new seismometer serves very effectively as a generator of electrical signals in response to the pressure of detected seismic waves. This new instrument is an independent generator of a voltage and does not need the use of an external source of electricity such as a carrier signal. Hence the recording instrumentation necessary is very simple.

In Fig. 2 there is shown another "squeeze" or "pressure" type seismometer using the principles of my invention. A hollow substantially cylindrical soft magnetic member is utilized with a long and narrow air gap 11 or slit being cut longitudinally of the hollow cylinder 15. The usual coil 12 is toroidally wound about the hollow cylindrical member 15. In this embodiment the thickness of the body is made according to the bending stiffness requirements of the instrument.

In Fig. 3 there is shown another embodiment of my invention which also can be used as a "squeeze" or "pressure" type seismometer. This embodiment is advantageous in winding separate coils 12. To this end the members 8 are shaped so that when connected together two hollow volumes 19 are formed which are connected by a very narrow slit or air gap 20.

In Fig. 4 there is shown an embodiment of my invention which is similar to that of Fig. 2 but has attached thereto a strip of hard magnet 22. This embodiment may be used at a sacrifice of sensitivity with a slight gain in permanency of magnetization.

The embodiment shown in Fig. 5 has as separator springs slightly oversize tubing 23 accommodated in slots 24. This embodiment has the advantage of giving an even springing effect over any desired length of members 8.

In the embodiment shown in Figs. 6 and 7, the semi-cylindrical members 8 each has only one pair of stiff springs 9 at one of its longitudinal extremities. The pair of stiff springs 9 of each member 8 is connected to the other member 8 by screws 26 screwed through blocks 25. Recesses 28 are provided in each semi-cylindrical member 8 to accommodate screws 26. The outward ends of springs 9, in this embodiment, are flush with the extremity of the member 8 to which it is screwed. The springs 9 are thereby protected against damage caused by hard handling. Spacers 10 provide the small air gap. A coil 12 is wound about each member 8 with a groove being provided to accommodate the coil.

In Figs. 8, 9, 10, and 11 there are shown embodiments of my invention which may be used as motion type pickups. In Fig. 8 the pair of soft magnetic material members are machined in H-shape and have the usual stiff cantilever springs 9 separated by spacer 10. The coil is wrapped about the H member 16 in a longitudinal groove 17 within said member 16. The lower member 16 has attached thereto a plurality of prongs 18 which are set into the ground in land prospecting. As can be seen, the lower member 16 moves in response to any impinging seismic waves and the motion of the lower member with respect to the upper member 16 sets up an alternating current in the coils 12.

In Fig. 9 the upper and lower members are made with a projecting core 21 and the coils 12 are wrapped about the projecting core. The usual extension 9 and spacer 10 are also provided.

The embodiment shown in Figs. 10 and 11 which is particularly adapted for prospecting in marshland is provided with an armature 30. The armature 30 is provided with a plurality of recesses 31 separated by approximately 120°. A plurality of stiff springs 32 is utilized to suspend the armature 30 within the housing. The soft magnetic material consists of a magnetic housing 33 and core 34. A coil 12 is wound about core 34.

Some illustrative examples will be worked using the demagnetization curve of Vanadium Permendur, a soft magnetic material having a coercive force of 2.7 oersteds, and the demagnetization curve of Hyflux Alnico, a hard magnetic material having a coercive force of about 600 oersteds.

Selected air gap spaces corresponding to a given magnet length can be represented by the intersections of the corresponding permeance coefficient values and the demagnetization curve of the material to be used. The permeance coefficient can be taken as equal to the ratio of the magnet length to the air gap length, which is also equal to the slope of a vector through the origin. The vectors representing several values of the permeance coefficient are shown on each of the curves on Figs. 12 and 13. The local magnetization-demagnetization loops such as aa' and bb' for small air gap variations can be represented by operating lines having a slope equal to the reversible permeability. The operating line is drawn through the intersection of the lower permeance coefficient since flux restoration along minor loops is not complete. Incremental changes in flux density corresponding to incremental gap changes can be taken from the intersection of the permeance coefficient vectors and on the operating line.

Approximate sensitivities in kilogauss per inch for various permeance coefficients and gap spaces will be determined.

$y$ = operating line $P$ = permeance coefficient
$= \frac{Lm}{Lg}$ = slope of permeance coefficient vector = $\frac{\text{gauss}}{\text{oersteds}}$ $I$ = flux density in gauss
$Lm$ = total magnet length
$Lg$ = total air gap length V.R. sensitivity from curve = $\frac{I'-I}{Lg-Lg'} = \frac{\Delta I}{\Delta Lg} = S$ $= \frac{\text{change in flux density}}{\text{change in air gap}}$ From Hyflux Alnico V, Fig. 12:

(I) $aa'$—

$Lm = 1.0''$
$Lg_a = 0.070'', P=14$
$Lg_{a'} = 0.035'', P=28$ } $S = \frac{900.}{.035} = 25.7$ K. gauss/in.

(II) $bb'$—

$Lm = 1.0''$
$Lg_b = 0.004, P=250.$
$Lg_{b'} = 0.002, P=500.$ } $S = \frac{50.}{.002} = 25.$ K.G./in.

Figure 13:
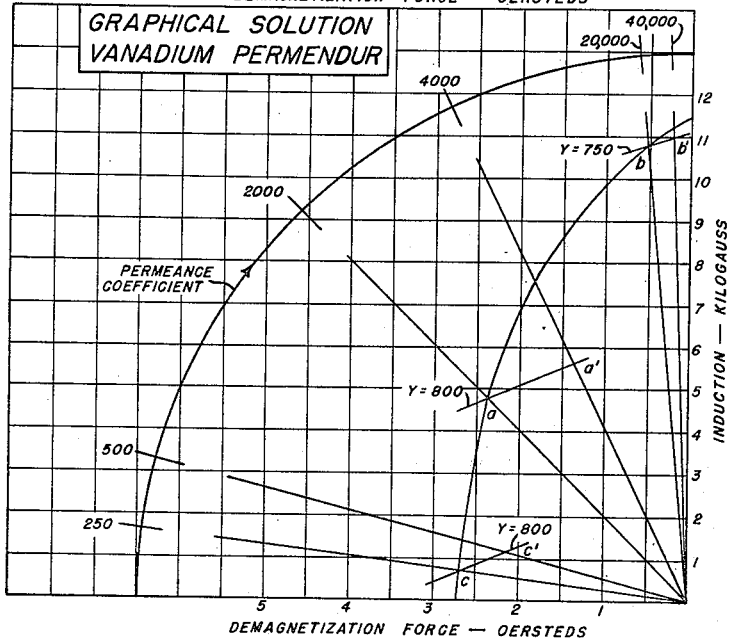

From Vanadium Permendure, Fig. 13:

(I) $aa'$—

$Lm = 1.0''$
$Lg_a = 0.0005, P=2000.$
$Lg_{a'} = 0.00025, P=4000.$ } $S = \frac{800}{.000025}$
$= 32,000.$ K.G./in.

(II) $cc'$—

$Lm = 1.0''$
$Lg_c = 0.004, P=250.$
$Lg_{c'} = 0.002, P=500.$ } $S = \frac{400.}{.002} = 200.$ K.G./in.

It can be seen from an examination of these results that a range of sensitivities can be obtained from a magnet of soft or hard material. Where practical dimensions are used such as from .002–.004 air gap, it can be seen that the Vanadium Permendure sensitivity is far greater. In all cases if the permeance coefficient is an optimum, the highest sensitivity comes from using the shortest magnet. If a very short Alnico magnet circuit is utilized a higher sensitivity results, but for many uses the size is too small for winding an appreciable amount of wire. Magnetic material having a reversible permeability of 10 or more is suitable for use in my new generator. Of course, the higher the reversible permeability the more sensitive the instrument will be.

If desired, the soft magnetic material of all the embodiments of my invention may be made of laminated construction.

From the foregoing description and analysis, the superiority of my invention over previous variable reluctance type transducers is clearly illustrated.

Having described my invention, I claim:

1. A generator device for detecting seismic waves and producing electrical signals indicative of said seismic waves, comprising: a magnetic circuit consisting of a pair of semi-cylindrical members of soft magnetic material having high residual magnetism, and at least two air gaps of the order of a few thousandths of an inch; each of said semi-cylindrical members having a pair of stiff spring extensions integrally connected to the ends thereof; said members being connected together at the extensions thereof and separated by spacer means to form an approximately hollow cylinder; said spacer means being adapted to provide said air gaps between said semi-cylindrical members; a coil wound about at least one of said semi-cylindrical members, a substantial voltage being inducible in said coil by minute changes in said small air gaps.

2. A generator device for detecting seismic waves and producing electrical signals indicative of said seismic waves, comprising: a magnetic circuit consisting of a pair of semi-cylindrical members of soft magnetic material having high residual magnetism, and at least one air gap of the order of a few thousandths of an inch; at least one spring extension connected to each member, each spring extension having a high natural frequency; spacer means spacing apart said spring extensions adapted to provide said at least one air gap; and a coil wound about at least one of said members, said soft magnetic members being deformed by the pressure of impinging seismic waves to produce a voltage across said coil.

3. A generator device for detecting seismic waves and producing electrical signals indicative of said seismic waves, comprising: a magnetic circuit consisting of a pair of members of soft magnetic material having high residual magnetism, and at least one air gap of the order of a few thousandths of an inch, at least one spring extension connected to each member; spacer means positioned between said spring extensions to provide said at least one air gap; and a coil wound about at least one of said members.

4. A generator device for detecting seismic waves and producing electrical signals indicative of said seismic waves, comprising: a magnetic circuit consisting of a pair of H-shaped members of soft magnetic material with high residual magnetism, and at least two air gaps each of the order of a few thousandths of an inch; each of said H-shaped members having a pair of stiff spring extensions integrally connected to the ends thereof; said members being connected together at the extensions thereof and separated by a spacer to provide said air gaps; one of said H-shaped members being adapted to move with the motions of the earth; a coil wound about at least one of said H-shaped members, a substantial voltage being inducible in said coil by a change in said air gap caused by said seismic waves.

5. A generator device for detecting seismic waves and producing electrical signals indicative of said seismic waves, comprising: a magnetic circuit consisting of a pair of semi-cylindrical members of soft magnetic material having high residual magnetism, and at least two air gaps each of the order of a few thousandths of an inch; tubing spring means separating said members to provide said air gap; and a coil wound about at least one of said semi-cylindrical members, a substantial voltage being inducible in said coil by minute changes in said air gaps.

References Cited in the file of this patent

UNITED STATES PATENTS

| | | |
|---|---|---|
| 252,256 | Rogers | Jan. 10, 1882 |
| 1,640,538 | Du Bois-Raymond | Aug. 30, 1927 |
| 1,748,993 | Purdy | Mar. 4, 1930 |
| 1,889,398 | Bishop | Nov. 29, 1932 |
| 2,269,453 | Gayhart | Jan. 13, 1942 |
| 2,311,079 | Parr | Feb. 16, 1943 |
| 2,328,222 | McCarty | Aug. 31, 1943 |
| 2,348,225 | Petty | May 19, 1944 |
| 2,637,823 | Anderson et al. | May 5, 1953 |
| 2,708,742 | Harris | May 17, 1955 |

OTHER REFERENCES

Electrical Engineers' Handbook, Foster, 6th ed., 1910, page 345.